Feb. 20, 1945.  H. ALLEN  2,369,650
PRESSURE GAUGE
Filed Nov. 26, 1940  3 Sheets-Sheet 1

HERBERT ALLEN
INVENTOR.

BY Lester B Clark
ATTORNEY

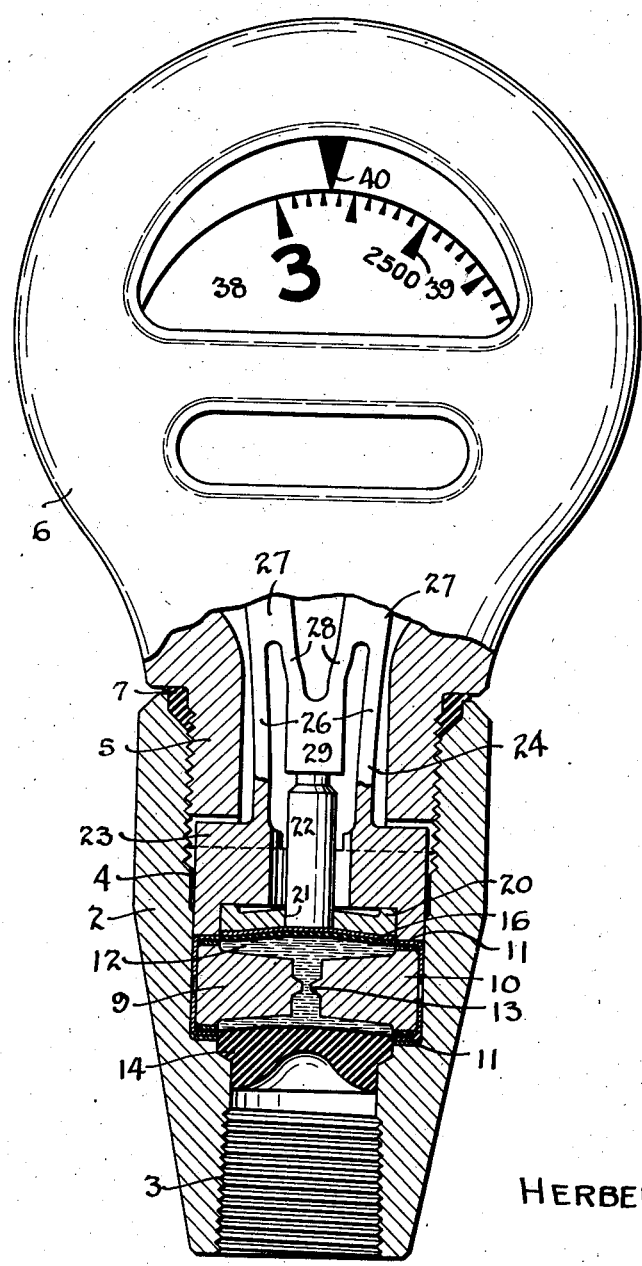

Feb. 20, 1945.  H. ALLEN  2,369,650
PRESSURE GAUGE
Filed Nov. 26, 1940  3 Sheets-Sheet 3
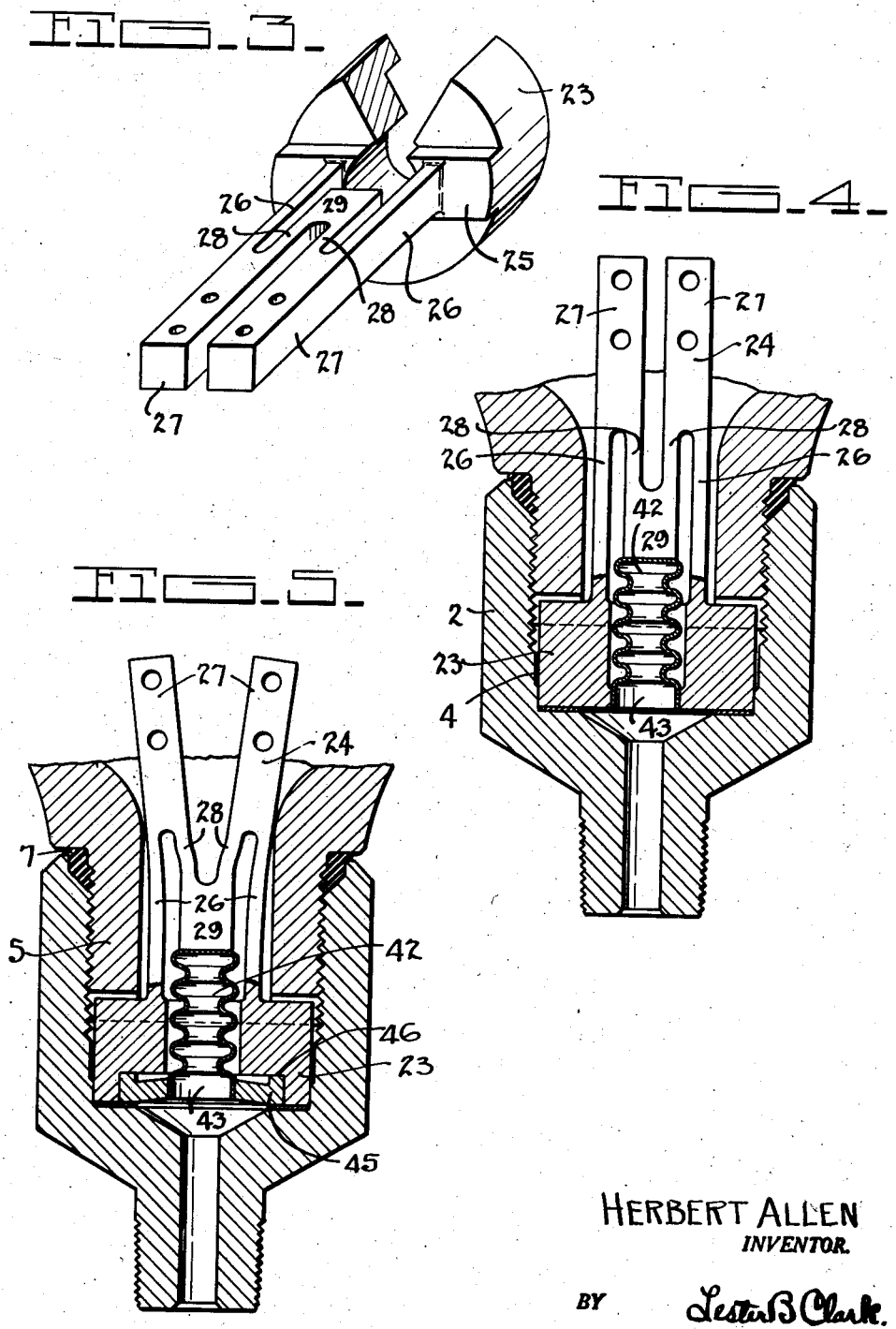
HERBERT ALLEN
INVENTOR.
BY Lester B Clark.
ATTORNEY Patented Feb. 20, 1945

2,369,650

UNITED STATES PATENT OFFICE 2,369,650

PRESSURE GAUGE

Herbert Allen, Houston, Tex., assignor, by mesne assignments, to Cameron Iron Works, Inc.

Application November 26, 1940, Serial No. 367,160

6 Claims. (Cl. 73—407)

The invention relates to a pressure gauge of the type wherein pressures of considerable magnitude are to be gauged.

In the devising of pressure gauges which are arranged to gauge pressures of a substantial amount, one of the difficulties arises in providing a spring or elastic system which will flex or move under the load of the pressure and which is sturdy enough to withstand the load and to operate accurately.

The present invention contemplates an elastic system a part of which is to flex due to the load of the pressure which is being gauged, and to this end a spring has been arranged wherein the applied load causes a flexing or bending of a part of the spring so that movement of the spring due to such load can be utilized for the purpose of operating the indicator device.

It is one of the objects of the invention to provide a pressure gauge having an elastic system to be flexed in accordance with the applied pressure so that an indication of the pressure may be obtained by determining the amount of the flexing.

Another object of the invention is to provide a pair of elastic systems, one of which will flex under the load of the other.

Another object of the invention is to provide a pair of stress members which are to be placed in compression in order to tilt the indicator arms of a pressure gauge.

Another object of the invention is to provide a stress unit for pressure gauges wherein a spring is utilized which is composed of a plurality of columns to be placed either under tension or compression in gauging the pressure.

Still another object of the invention is to provide a pressure gauge in which a portion of an elastic system or spring is acted upon or loaded by the pressure at a point where a small flexure results from the loading, and having other parts where larger flexing results from the first or smaller flexing and to which system an indicating mechanism may be attached.

Still another object of the invention is to provide a pressure gauge with an elastic system which, when subjected to a load due to the pressure, sets up a strain of different magnitude in different parts of the system so that the flexing thereof may be indicated.

Still another object of the invention is to provide an elastic system or spring for pressure gauges wherein one part is flexed by the application of the load and another part is utilized to amplify the flexing so as to obtain an indication of the applied pressure.

A still further object of the invention is to provide a combination elastic system or spring for pressure gauges with a means to apply the pressure thereto, such as a load pin or Sylphon bellows.

Still another object of the invention is to provide a bellows device for pressure gauges wherein the bellows has very little movement but serves to transmit the load from one elastic system to another elastic system in the pressure gauge.

It is also an object of the invention to provied an elastic system for pressure gauges wherein a plurality of loaded members are related to each other so that the ends of some of the members cause bending stresses in other of the members and where the members are integrally connected at opposite ends.

Other and further objects of the invention will be readily apparent when the following description is considered in connection with the drawings wherein:

Fig. 2 is a front elevation of the gauge of Fig. 1 and shows the indicator as having been operated by the elastic system of the units when the load is applied.

Fig. 3 is a perspective view of the elastic system.

Fig. 4 is a side elevation of a modified form of the device shown as having a Sylphon bellows which is utilized as a part of the elastic system.

Fig. 5 is a view similar to Fig. 4 but showing the device as having been loaded.

Figure 1:
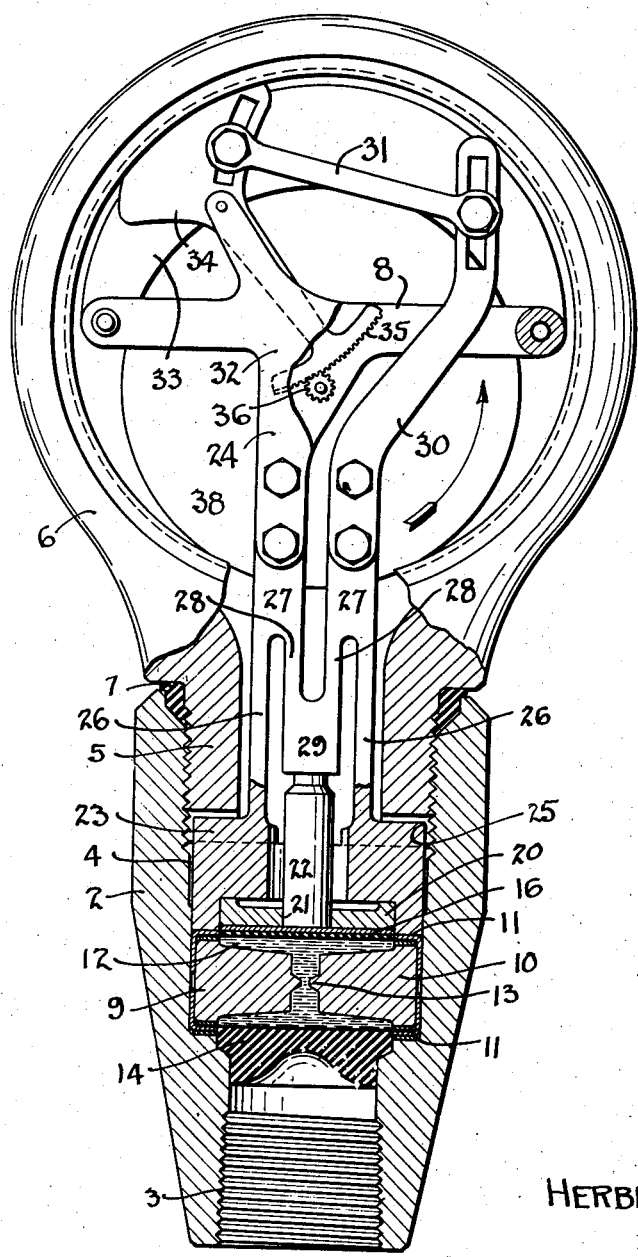
Fig. 1 is a side elevation showing the back side of a pressure gauge with certain parts shown in section to illustrate the construction of the parts.

In Fig. 1 a connection base 2 is illustrated as being threaded at 3 for attachment to a conduit or pipe containing fluid or pressure to be gauged. This base has a recess 4 therein which receives the lower end 5 of the housing 6. This housing may be sealed in the base by the packing at 7 and is arranged to contain the indicator mechanism 8. The indicator mechanism is mounted upon a pressure unit 9 which is in the form of a body 10 enclosed by the upper and lower diaphragms 11 and which is filled with a liquid 12 to surge back and forth through the restriction 13, as the pressure is applied through the buffer plate 14.

The particular construction of this diaphragm unit and load pin assembly is disclosed and claimed in my Patent 2,297,678 dated October 6, 1942, while the beam structure is shown generally and claimed in my issued Patent 2,297,679 dated October 6, 1942, both of which patents resulted from copending applications.

It seems obvious that the pressure entering the lower portion of the base 2 will create a pressure on the diaphragm unit, causing the lower diaphragm to flex upwardly. This moves the liquid 12 against the upper diaphragm 11, causing it in turn to flex upwardly.

Above the diaphragm 11 are the distributor plates 16 which are provided in order to distribute the pressure transmitted to the upper diaphragm 11. The drawing shows the lower plate as being of resilient material and the upper plate of metal or flexible material. Above these distributor plates is an elastic system which will receive the pressure from the diaphragm 11 and is intended to flex with the diaphragm. This system includes a plate 20 of a suitable material so that it may flex as seen in Fig. 2, due to the load of the applied pressure. A load pin 22 may be considered as a part of this elastic system because this load pin is positioned in the opening 21 in the plate 20.

As seen in Fig. 2, it will be obvious that as the plate 20 is flexed, the pin 22 will move therewith. The pin 22 is shown as rigid but is used to transmit the load occurring due to the applied pressure.

Another elastic system or spring 24 is utilized for the purpose of being loaded by the first elastic system. The flexing of this elastic system 24 is utilized to operate the indicator mechanism which will be later described.

The elastic system 24 is in the form of a stress unit or spring which is seen in perspective view in Fig. 3, and includes a base 23 which is of a size to fit within the coupling 2 and be positioned on top of the diaphragm 11.

The base 23 has a cross portion on the top thereof which is in the form of a beam 25. This beam is of peculiar construction in that it has the ends thereof formed integrally with the base 23, but the intermediate portion is in the form of a spring which has a pair of upstanding legs or columns 26 which are formed integrally with the ends 25 of the beam. These columns 26 merge with the arms 27, which arms, in turn, have the columns or portions 28 extending downwardly therefrom as viewed in Fig. 1.

The columns 28 are short as compared with the columns 26, but when the device is unloaded or in its normal position, as seen in Fig. 1, the columns 26 and 28 are parallel. The lower ends of the columns 28 are joined by a head or rigid portion 29 so that it will be seen that the lower ends of the columns 26 are affixed to a rigid base and the lower ends of the columns 28 are affixed to the rigid head, while the upper ends of the two sets of columns are joined in an arm 27.

Another manner of describing this construction would be to say that the entire unit 24 is in the form of a flat spring having a slot extending inwardly at one end to form the arms 27, and two slots extending inwardly from the other end in spaced relation so as to define the columns 26. The inner ends of these slots would overlap to provide the short columns 28, and the head 29 is provided by the center portion of the spring being removed to accommodate the load pin 22 as seen in Fig. 1.

In operation of the device the flexing of the lower elastic system due to the application of the pressure being gauged will effect a movement of that system, which is transmitted by the load pin 22 into a vertical upward movement. The flexing of the plate 20 and the load pin 22 is opposed however, by the inherent resiliency of the elastic system 24 and the lower elastic system and the load pin 22 can only move as the upper elastic system 24 is caused to flex by the load. It seems obvious, therefore, that the flexing of the system 24 is a function of the applied pressure, and Fig. 2 shows both of the elastic systems as having been stressed or flexed because the diaphragms 11 are flexed upwardly.

The load pin 22 has moved up insofar as it has been permitted to move by the flexing of the columns 26 and 28. Of course, the bending of the columns 26 and 28, as seen in Fig. 2, is merely diagrammatical to show that the arms 27 are spread apart when the system is loaded.

Generally the elastic system 24 encompasses a plurality of loading members that are related to each other so that the loads on the end of some of the members set up a bending stress due to the reaction of the other members which are attached at opposite portions from the loaded portion.

It is intended that this elastic system may take various forms of column or spring arrangements of the parts, and that generally the invention contemplates that a device will be provided wherein a portion acted upon by the pressure executes a small flexing movement as a result of the load, and wherein, further, other parts of the elastic system connected to the first part or portion executes a much larger flexing movement as a result of the flexing of the first part, so that this amplification due to the last flexing can be utilized for the purpose of operating an indicating mechanism.

The indicator mechanism is best seen in Fig. 1, and includes a bracket 30 on one arm which is arranged to adjustably receive the lever 31. A somewhat different bracket 32 is affixed to the other arm 27 and serves as a support for a mounting 33. A lever 34 is pivoted on the bracket 32 and carries a rack 35 to engage the pinion 36.

With this construction it seems obvious that relative spreading apart of the arms 27 and consequently the brackets 30 and 32 tends to move the rack and pinion construction so as to turn the indicator disc 38, to which the pinion 36 is attached. This disc is seen in front elevation in Fig. 2 and carries the indicia 39 which moves relative to the zero mark 40.

In operation the pressure is applied through the housing to the diaphragm unit which will move due to the application of such pressure in an amount which is a function of the pressure, and this movement is permitted only by the flexing of the upper and lower elastic units. The parts will move from the position of Fig. 1 to that of Fig. 2 due to this loading and it will be noted that the legs or columns 28 of the spring have flexed a slight amount, whereas, the columns 26, being longer, have flexed a greater amount, causing the arms 27 to separate or spread apart and it is the spreading of these arms which operates the indicator mechanism.

Figs. 4 and 5 show an arrangement similar to that previously described except that the load pin 22 and pressure unit 9 have been replaced with a Sylphon bellows 42. Fig. 4 shows the base 43 of this Sylphon unit as having been rigidly affixed to the base 23 of the elastic system so that the bellows will execute a very small amount of elongating movement, but the principal resistance to pressure is in a radial direction. In this manner the friction loss will be negligible and the small amount of elongation of the Sylphon unit will be permitted due to the flexing of the upper elastic unit 24.

Fig. 5 shows a slightly modified form of the Sylphon bellows wherein the plate of the lower elastic system of Fig. 1 is retained and the base 43 of the Sylphon bellows is connected rigidly to this elastic system by being attached to the plate 45, as seen in Fig. 5.

In this form the lower end 43 of the bellows will move along with the elastic plate 45, while the upper end of the bellows will move with the elastic system 24, so that the bellows, as a matter of fact, executes a movement as a unit but does little or no flexing or expanding on its own account. In other words, it acts the same as a beam under similar pressure because the bellows floats between two elastic systems.

The bellows of Figs. 4 and 5 is of advantage because the diaphragm unit can be dispensed with and the pressure being gauged may flow directly into the bellows.

Broadly, the invention contemplates a pressure gauge wherein an elastic system or spring will flex as a function of the applied pressure to indicate the applied pressure.

What is claimed is:

1. A damped pressure gauge including a housing, a liquid filled diaphragm unit therein to receive and damp the thrust of the pressure being gauged, a load pin to transmit the thrust on said unit an indicator assembly clamped against said unit load pin and including arms to be flexed by the pressure, each arm including a pair of legs to set up a force couple to flex the arms, one long and one short leg comprising each pair, said load pin acting to transmit the thrust on said unit to the short leg of each pair whereby to flex the long leg of each pair and cause lateral movement of the arms.

2. A pressure indicator unit including a pair of spaced columns to jointly receive the thrust of the pressure in compression, another pair of spaced columns movable by the first columns to react by lateral movement to such thrust in tension, said pairs of columns being interconnected, offset, and normally parallel, and means to indicate the resultant lateral movement as an indication of the pressure applied.

3. In a pressure gauge a stress member comprising an elongated body, a slot extending into said body from one end, a pair of spaced slots extending into said body from the other end, said slots overlapping at their inner ends to provide a pair of inner columns, means to apply compression to the portion between said pair of slots, and means to anchor the portions outside of said pair of slots so that the spaced portions defined at the other end of the body by said first slot will be displaced as a function of the applied compression.

4. A pressure gauge including a base to be attached to the source of pressure to be gauged, a casing connected to said base, means clamped between the casing and base and projecting into the casing to indicate the applied pressure, said means including a pair of elastic systems to be stressed, one of said systems including a member to flex under fluid pressure and another member disposed to flex in unison with said first member, the other of said systems including means to be flexed by the load applied from said second member, comprising a series of normally parallel interconnected offset columns and having a portion to apply compression to the ends of one pair of columns so as to exert tension on another pair of said columns whereby the offset position tends to spread said last pair of columns apart, and an indicator mechanism operable in accordance with such flexing.

5. A pressure responsive device including a housing, a member therein exposed to pressure, an elastic means in contact with said member to yield under pressure from said member and produce a counteracting force against such member, additional means to produce a counteracting force against said member and to move as a function of pressure exerted on said member comprising a spring having a series of normally parallel interconnected offset columns to be flexed by the applied pressure, means forming part of said spring to apply compression to the ends of one pair of said columns so as to exert a tension on another pair of said columns whereby the offset position tends to spread said last pair of columns apart, and means to make manifest the movement of said second means due to pressure on said member.

6. In a pressure gauge an elastic system including a spring, a plurality of pairs of normally parallel interconnected columns therein to be subjected to stress, one pair of said columns being connected in an offset position to the ends of another pair so that the load of the pressure being gauged on said first pair will tend to spread the other connected pair, and a leverage mechanism operable by the spreading of said pair of columns, said leverage mechanism including a link connected to each of one of said pair of spreading columns and to each other so that movement of the links is a measure of the pressure being gauged.

HERBERT ALLEN.